United States Patent
Balasubramanian et al.

(10) Patent No.: US 11,148,979 B2
(45) Date of Patent: Oct. 19, 2021

(54) PROCESS FOR FORMING SINTERED CERAMIC BODIES HAVING IMPROVED PROPERTIES

(71) Applicant: James R. Glidewell Dental Ceramics, Inc., Newport Beach, CA (US)

(72) Inventors: Sreeram Balasubramanian, Irvine, CA (US); Yan Yang, Irvine, CA (US); Akash, Irvine, CA (US)

(73) Assignee: James R. Glidewell Dental Ceramics, Inc., Newport Beach, CA (US)

(*) Notice: Subject to any disclaimer, the term of this patent is extended or adjusted under 35 U.S.C. 154(b) by 322 days.

(21) Appl. No.: 16/176,768

(22) Filed: Oct. 31, 2018

(65) Prior Publication Data
US 2019/0127284 A1    May 2, 2019

Related U.S. Application Data

(60) Provisional application No. 62/579,464, filed on Oct. 31, 2017.

(51) Int. Cl.
*C04B 35/48* (2006.01)
*C04B 35/64* (2006.01)
(Continued)

(52) U.S. Cl.
CPC .......... *C04B 35/64* (2013.01); *A61C 13/0006* (2013.01); *A61C 13/0022* (2013.01); *B28B 11/243* (2013.01); *C04B 35/48* (2013.01); *C04B 35/486* (2013.01); *A61C 5/77* (2017.02); *C04B 2235/3246* (2013.01); *C04B 2235/608* (2013.01); *C04B 2235/6027* (2013.01); *C04B 2235/6562* (2013.01);
(Continued)

(58) Field of Classification Search
None
See application file for complete search history.

(56) References Cited

U.S. PATENT DOCUMENTS

| | | | |
|---|---|---|---|
| 3,900,542 A | 8/1975 | Palmour, III et al. | |
| 4,713,233 A | 12/1987 | Marsh et al. | |

(Continued)

FOREIGN PATENT DOCUMENTS

| WO | 2007078902 A1 | 7/2007 | |
|---|---|---|---|
| WO | WO-2007110565 A1 * | 10/2007 | ............ C04B 35/111 |
| WO | WO-2012074504 A1 * | 6/2012 | ......... B01D 39/2068 |

OTHER PUBLICATIONS

Phase Evolution in Yttria-Stabilized Zirconia Thermal Barrier Coatings Studied by Rietveld Refinement of X-Ray Powder Diffraction Patterns Sep. 2007Journal of the American Ceramic Society 90(9):2935-2940 DOI: 10.1111/j.1551-2916.2007.01785.x (Year: 2007).*

(Continued)

*Primary Examiner* — Alison L Hindenlang
*Assistant Examiner* — Andrés E. Behrens, Jr.
(74) *Attorney, Agent, or Firm* — Charles Fowler

(57) ABSTRACT

A method is provided for making ceramic bodies having improved properties, such as optical and/or strength properties in which the ceramic bodies are densified by new sintering processes. The sintering profiles may have shorter run times than conventional sintering processes. Ceramic bodies made by these methods are suitable for use in dental applications, for example, as crowns.

11 Claims, 5 Drawing Sheets

(51) Int. Cl.
*C04B 35/486* (2006.01)
*A61C 13/00* (2006.01)
*B28B 11/24* (2006.01)
*A61C 5/77* (2017.01)

(52) U.S. Cl.
CPC ............... *C04B 2235/6567* (2013.01); *C04B 2235/661* (2013.01); *C04B 2235/785* (2013.01); *C04B 2235/96* (2013.01); *C04B 2235/9653* (2013.01)

(56) References Cited

U.S. PATENT DOCUMENTS

| | | | |
|---|---|---|---|
| 4,755,492 A | 7/1988 | Greskovich et al. | |
| 5,096,862 A | 3/1992 | Mathers et al. | |
| 5,391,339 A | 2/1995 | Wei et al. | |
| 6,284,692 B1 | 9/2001 | Jue et al. | |
| 7,037,831 B2 * | 5/2006 | Watanabe | C04B 35/465 438/660 |
| 8,110,140 B2 | 2/2012 | Hasegawa | |
| 8,298,329 B2 | 10/2012 | Knapp et al. | |
| 9,005,517 B2 * | 4/2015 | Bronfenbrenner | C04B 35/195 264/631 |
| 9,033,703 B2 | 5/2015 | Rohner et al. | |
| 9,095,403 B2 | 8/2015 | Carden et al. | |
| 9,365,459 B2 | 6/2016 | Carden et al. | |
| 9,434,651 B2 | 9/2016 | Carden | |
| 9,512,317 B2 | 12/2016 | Carden et al. | |
| 9,545,363 B2 | 1/2017 | Kim et al. | |
| 9,557,114 B2 | 1/2017 | Rohner et al. | |
| 2007/0006561 A1 * | 1/2007 | Brady | C04B 26/28 55/523 |
| 2009/0115084 A1 | 5/2009 | Moon | |
| 2012/0139141 A1 | 6/2012 | Khan et al. | |
| 2015/0183690 A1 | 7/2015 | Kim et al. | |
| 2016/0032483 A1 | 2/2016 | Schenk et al. | |
| 2017/0350002 A1 * | 12/2017 | Yamazaki | C04B 35/01 |
| 2018/0133112 A1 | 5/2018 | Brodkin et al. | |
| 2019/0321148 A1 * | 10/2019 | Jussel | A61C 13/083 |
| 2021/0093517 A1 * | 4/2021 | Hauptmann | C04B 35/486 |

OTHER PUBLICATIONS

"Yttria-Stabilized Zirconia." Wikipedia, Wikimedia Foundation, Aug. 22, 2017, web.archive.org/web/20170822065942/en.wikipedia.org/wiki/Yttria-stabilized_zirconia. (Year: 2017).*

Alicia Fernandez Oliveras et al., Gloss measurements and rugometric inspection in dental biomaterials, Reseachgate.net 2008-2017, printed Jun. 7, 2017, in 2 pages.

Z. Razavi Hesabi et al., Enhanced electrical conductivity of ultrafine-grained 8Y2O3 Stabilized ZrO2 produced by two-step sintering technique, Journal of Alloys and Compounds 494, dated 2010, p. 362-363.

Jian Chao et al., Influence on microstructure of dental zirconia ceramics prepared by two-sintering, West China Journal of Stomalogy, vol. 31, No. 5, Oct. 2013, in one page.

Yan Xiong et al., Dynamic pore coalescence in nanoceramic consolidated by two-step sintering procedure, Journal of the European Ceramic Society 33, 2013, pp. 2087-2092.

Mehdi Mazaheri et al., Densification and grain growth of nanocrystalline 3Y-TZP during two-step sintering, Journal of the European Ceramic Society 28, 2008, pp. 2933-2939.

N.J. Loh et al., A review of two-step sintering for ceramics, Ceramics International 42, 2016, pp. 12556-12572.

Chih-Jen Wang et al., Two-step sintering of fine alumina-zirconia ceramics, Ceramics International 35, 2009, pp. 1467-1472.

L.B. Kong et al., Chapter 2, Transparent Ceramics, Topics in Mining, Metallurgy and Material Engineering, DOI 101007/978-3-319-18956-7_2, 2015, pp. 29-91.

* cited by examiner

PROCESS FOR FORMING SINTERED CERAMIC BODIES HAVING IMPROVED PROPERTIES

RELATED APPLICATIONS

This application claims the benefit of and priority to U.S. Provisional Patent Application No. 62/579,464, filed Oct. 31, 2017, which is hereby incorporated by reference in its entirety.

BACKGROUND

Sintering processes have been developed to influence the microstructure of zirconia ceramic materials in an effort to form sintered bodies optimized for strength and translucency. In some conventional processes, zirconia ceramic bodies are sintered at an oven temperature between about 1300° C. and 1700° C., and held at the temperature for a few hours to several days. In other methods, ceramic bodies are heated at a first oven temperature (e.g., between 1200° C. and 1300° C.) for a short time, before lowering the oven temperature to a second temperature (e.g. 1050° C. to 1100° C.) that is held for a duration that may exceed 10 hours to 30 hours. In other processes, conventional sintering at temperatures between 1500° C. and 1700° C., held for two to forty hours, are followed by hot isostatic pressing (HIP treatment) at 1400° C. to 1700° C., in an attempt to further reduce porosity, and optimize translucency and mechanical properties for suitable for use in dental applications.

SUMMARY

A multistage sintering method is provided for forming fully sintered ceramic bodies suitable for use in industrial applications that require enhanced strength and/or enhanced aesthetics. Among other applications, the methods are suitable in dental applications for making ceramic bodies that have densities closely approaching the material's theoretical value. Resulting sintered bodies have minimal inter-granular porosity, reduced grain size with narrow grain size distribution, enhanced optical properties, and/or improved strength compared to materials densified by conventional sintering processes.

Multistage sintering processes provided herein may have shorter run times than most conventional ceramic sintering processes. In some embodiments, a first heating stage comprises a rapid temperature increase to a first peak temperature which is held for an optional first dwell time, and then the oven temperature is rapidly decreased to a second temperature, forming a heating spike or peak. A second heating stage comprises heating the oven to the second temperature that is lower than the first peak temperature, and holding the second temperature for a second dwell time that is longer than the first dwell time. A subsequent or final heating stage may comprise increasing the sintering oven to a third peak temperature, higher temperature than the second, prior stage, and holding for an optional third dwell time before lowering the oven temperature in a cool-down stage to a temperature safe for removing sintered ceramic bodies. In some embodiment, sintering profiles comprise one, two or more temperature spikes, or peaks, having higher peak temperatures than preceding and/or subsequent stages at lower temperatures, formed by rapid oven temperature changes between heating stages.

In one embodiment, a multistage sintering process comprises first, second, and third heating stages, and the oven temperature of the second heating stage is at least 25° C. lower than the peak temperature of the first and/or third heating stage. In some embodiments, the second heating stage is at least 50° C. lower, or at least 100° C. lower, than the oven temperature of the first and/or third heating stage, and optionally the first heating stage. The first and third heating stages may have a total dwell time of from 0 minutes to 20 minutes. The second heating stage may have a longer dwell time than the total dwell time of the first and third heating stages, of between 10 minute and 8 hours at the second oven temperature.

In one method, the oven temperature is rapidly increased from a preliminary heating temperature (T0) to a first oven temperature (T1) of the first heating stage, having a programmed ramp rate that is in the range of 0.5° C./min to 25° C./min. In this embodiment, the first oven temperature (T1) is held for a dwell time of zero to ten minutes, before the oven temperature is rapidly reduced (at a program duration of 0 minutes to 10 minutes) to a second oven temperature (T2), thereby forming a first temperature (T1) peak. The second heating stage, having a temperature (T2) that is at least 50° C. lower than T1, is held for a short dwell time, for example less, than 2 hours. The oven temperature of the second heating stage is rapidly increased with a program ramp rate in the range of 1° C./min to 60° C./min, to a third oven temperature in a third heating stage that is at least 50° C. higher, or at least 100° C. higher, than the second stage oven temperature. The third heating stage temperature may comprise a dwell time in the range of 0 minutes to 20 minutes, forming a final temperature peak in the final heating stage as the temperature is decreased in a cooling stage to a temperature suitable to removed sintered bodies from the oven (e.g., ambient, or around 25° C.). In this embodiment, the multistage sintering process comprises a lower temperature heating stage (second heating stage) between two higher temperature spikes (first and third heating stages), wherein the dwell time of the second heating stage is less than 5 hours, or in another embodiment, less than 2 hours, and is greater than either of the dwell time of the first and third heating stages. The total run time of the multistage heating process may be less than 5 hours from the end of the preliminary heating stage to the end of the sintering process, before the start of the cool-down stage.

Sintered zirconia ceramic materials have optical properties suitable for use in anterior and posterior dental restoration applications, such as crowns, veneers, inlays, onlay, partial crown or bridges, while achieving high strength values and minimized grain growth. In some embodiments, the sintered ceramic bodies have higher strength, smaller average grain size, unchanged or increased translucency values, and/or higher gloss values, compared to ceramic materials made by conventional sintering techniques having longer processing times.

DETAILED DESCRIPTION

Figure 1:
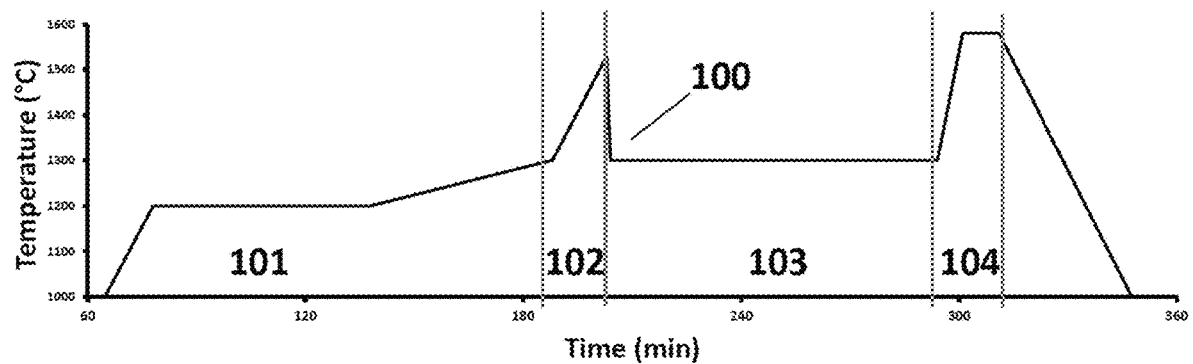
FIG. 1. Graphical representation of one embodiment of a sintering program that comprises a preliminary heating stage and multistage sintering profile.

A multistage sintering method for sintering ceramic materials in a sintering oven suitable for use in ceramic industrial applications is exemplified in the sintering profile program of FIG. 1. In this embodiment, the programmed sintering profile (100) shows a portion of a preliminary heating stage (101), and the multi-stage sintering profile comprising first (102), second (103) and third (104) heating stages in which the sintering oven temperature of the second heating stage (103) is at least 25° C. less than the oven temperature at the first (102) and third heating stages (104). The sintering profile of FIG. 1 has a shorter run cycle than the conventional sintering method (200) exemplified in FIG. 2.

Ceramic powder used to form the ceramic bodies may comprise a mixture of metal oxides that include, but are not limited to, stabilized metal oxides (including fully and partially stabilized metal oxides), and unstabilized metal oxides, such as zirconium oxide, aluminum oxide, yttrium oxide, magnesium aluminate, precursors thereof, and combinations of oxides and precursors, thereof. Zirconia ceramic materials include both stabilized and unstabilized zirconia. Zirconia ceramic material having greater than 83 wt % zirconia may further comprise 0 wt % to 1 wt % alumina, based on the total weight of the ceramic material. Zirconia ceramic materials may comprise yttria, ceria, magnesia, calcia, alumina, or combinations thereof, for example, as a stabilizer.

In some embodiments, yttria-stabilized zirconia ceramic materials may comprise an amount of yttria that is in the range of from 1 mol % yttria to 8 mol % yttria, or from 2 mol % yttria to 7 mol % yttria, or from 4.5 mol % yttria to 6.5 mol % yttria, or from 3 mol % yttria to 6.0 mol % yttria, or 4.5 mol % yttria to 5.7 mol % yttria, including, 4.7 mol % yttria, such as 4.75 mol % yttria, or which as used herein includes 4.75 mol % yttria±0.15 mol % yttria. Yttria-stabilized ceramic materials may comprise an amount of yttria that is in the range of from 5 mol % yttria to 7 mol % yttria, or 5 mol % yttria to 6.5 mol % yttria, or 5 mol % yttria to 6 mol % yttria, including 5.3 mol % yttria, which, as used herein, includes 5.3 mol % yttria±0.15 mol % yttria. Stabilized zirconia materials suitable for use herein include, but are not limited to, commercially available materials through Tosoh, USA, and materials made according to methods disclosed in commonly owned U.S. Pat. No. 8,298,329, which is incorporated, herein, by reference in its entirety. Specific examples of yttria-stabilized zirconia materials suitable for use herein include Tosoh 3YS (containing 3 mol % yttria), Tosoh Zpex® 4 (containing 4 mol % yttria), and Tosoh Zpex® Smile (containing 5 mol % to 6 mol % yttria).

Ceramic powders may also containing mixtures of ceramic materials containing varying levels of yttria, for example, to achieve an yttria level not commercially provided in a ceramic powder. In some embodiments, the median primary particle size of stabilized zirconia powder is less than 1 µm, or less than 0.5 µm, or less than 0.1 µm.

Optional additives include coloring agents and aesthetic additives, such as oxides, salts, or other compounds of erbium, terbium, chromium, cobalt, iron, manganese, and/or other coloring ions used to obtain shades in final sintered ceramic forms comparable to 16 Vita® classical shades, Vita® Bleached shades, or Vita 3D Master® shades, with desired optical properties, such as translucency or gloss.

Shaded ceramic powders include those that are commercially available, or are shaded by known processes. Coloring agents may be incorporated during formation of the ceramic powder or after formation of the ceramic powder. Ceramic powders shaded after powder formation may be mixed with coloring solutions as ceramic slurries as described in U.S. Pat. No. 9,365,459, which is incorporated by reference herein, in its entirety. Colored ceramic powders may be subsequently formed into green state ceramic bodies by isostatic or biaxial press manufacturing processes, as described in commonly owned U.S. Pat. No. 9,512,317, also incorporated by reference herein in its entirety. Coloring agents comprising metallic salts in the form of coloring liquids may be mixed directly with unshaded or white ceramic powders, prior to pressing into blocks. Further, colored ceramic powders may be blended with other colored or uncolored ceramic powders to achieve a shaded ceramic material suitable for use in dental applications. Optionally, intermediate shapes comprising porous ceramic materials may be shaded by infiltration or dipping into coloring liquids prior to sintering to full density, for example, as described in commonly owned U.S. Pat. No. 9,095,403, which is hereby incorporated in its entirety, herein.

Green stage ceramic bodies are made from unshaded or shaded ceramic powders by processes that include, but are not limited to, uniaxial, biaxial or cold isostatic pressing finely divided ceramic particles, with or without the use of a binder. Pressing processes include, but are not limited to, those described in U.S. Pat. No. 9,512,317. Other techniques include slip casting processes, such as those described in commonly owned U.S. Patent Publication No. 2009/0115084, and commonly owned U.S. Pat. Nos. 9,365,459 and 9,434,651, all of which are incorporated, herein, by reference, in their entirety. Other methods for forming green bodies may include 3D printing, gel casting, centrifugal casting, filter pressing, extrusion and injection molding.

Ceramic green stage bodies formed from ceramic powders are, optionally, pre-sintered, or heated to a porous, bisque stage, before sintering by a multistage sintering process. During a pre-sintering step, a binder, if used, may be removed from the green body and trapped gasses may be driven off. The resulting bisque stage solid body may have a measured density of between 2.1 g/cm$^3$ and 5.2 g/cm$^3$, or between 2.4 g/cm$^3$ and 4.7 g/cm$^3$, or between 2.7 g/cm$^3$ and 4.0 g/cm$^3$.

The ceramic green body may be pre-sintered by placement in an oven that is then heated to between 400° C. and 1400° C., and held at the temperature for 30 minutes to two weeks. For example, a zirconia ceramic green body may be pre-sintered by placement in an oven that is heated to a temperature between 900° C. and 1100° C., and held at for about 30 minutes to 10 hours. In one embodiment, a green body is placed in an oven that is heated to approximately 1200° C. for a hold time of 60 minutes at 1200° C.

A porous ceramic body, such as a milling block, may be shaped in either a green stage or bisque stage by known processes for forming ceramic bodies, including material subtraction methods, such as milling or grinding, to form an intermediate shaped ceramic form. The intermediate form may have substantially the same geometry as the final, sintered form, with an enlarged size compared to the target size of the final sintered body to accommodate shrinkage upon sintering. For example, a dental restoration, such as a single unit crown, or a multi-unit bridge, or full-arch or partial-arch denture may be shaped as an enlarged intermediate form from a porous ceramic body such as a milling block, prior to sintering to full theoretical density.

Additionally, the green or bisque stage body is optionally heated in a preliminary heating step prior to beginning the multistage sintering process. In some embodiments, during a preliminary heating step, the temperature of the sintering oven may be increased from ambient temperature using one or more ramp rates, optionally, holding at a constant temperature for a period of time, to at least partially densify the ceramic body, reduce porosity, close pores, maintain pores at grain boundaries and/or minimize grain growth. In some embodiments, in a preliminary heating step the sintering oven may be heated to a preliminary heating temperature, for example, in a range from 900° C. to 1300° C., that is lower than the highest temperature of the multi-stage sintering profile. Through pre-sintering and/or the preliminary heating step, the density of a green body or bisque body may be increased to a relative density, for example, that is between 45% and 95%, or between 75% and 95%, or between 85% and 95%, or between 60 to 85%, or between 50% and 80%, of the fully sintered, theoretical density of the ceramic body, when calculated according to the method provided herein.

In a multistage sintering process (100), exemplified in FIG. 1, after heating the oven (e.g. for example, from ambient temperature) to a preliminary heating temperature in a preliminary heating stage (101), the oven temperature may be rapidly increased to a first heating temperature in a first heating stage (102) at a ramp rate that is in the range of 0.5° C./minute to 60° C./minutes, or alternatively at a rate that is in the range of 1° C./minute to 25° C./minutes. After heating to the first heating temperature and holding for an optional dwell time, the oven temperature is rapidly lowered (e.g., a program duration of 1 minute to 20 minutes, or 1 min. to 10 min.) to a heating temperature of a second heating stage (103). The oven temperature of the second heating stage may be at least 25° C. to 700° C. lower, or 50° C. to 500° C. lower, than the first temperature of the first heating stage. The second heating stage may have a dwell time greater than 1 minute. In a third heating stage (104), the oven temperature is rapidly raised from the second heating temperature to a third heating temperature that is between 50° C. to 700° C. higher than the temperature of the second heating stage. The temperature may be increased from the second heating stage to the third heating stage at a ramp rate setting that is between 1° C./minute and 60° C./minutes, or 10° C./minute and 30° C./minutes. The third heating stage may have an optional dwell time of 0 minutes to 20 minutes, before rapidly cooling the oven within about 30 minutes to 60 minutes in a cool-down stage, to remove the sintered ceramic body. Sintering processes occur at atmospheric pressure.

Figure 3:
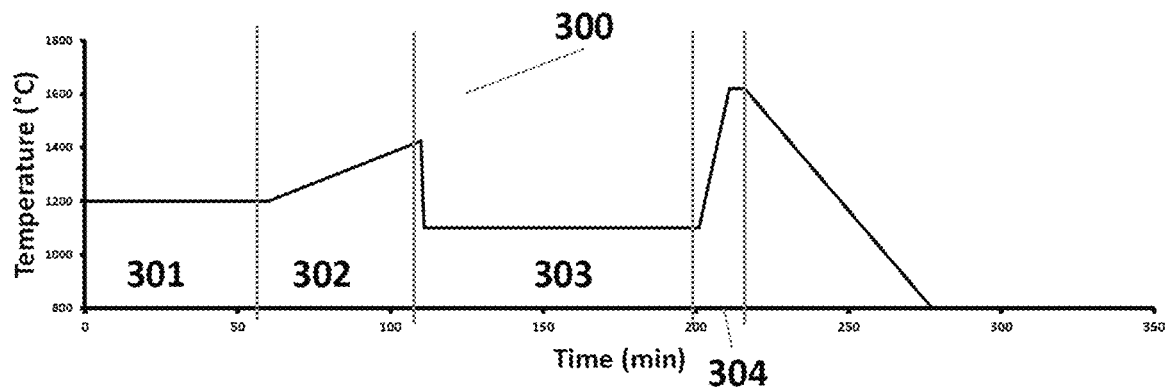
FIG. 3. Graphical representation of a sintering profile according to one embodiment.

In other embodiments, such as the sintering process (300) exemplified in FIG. 3, a preliminary heating stage (301) precedes the sintering process, having a first heating stage (302), a second heating stage (303), and a third heating stage (304). A maximum (peak) oven temperatures of both the first and third heating stages are 50° C. to 450° C. higher, or 150° C. to 450° C. higher, than the peak oven temperature of the second stage (303). Alternatively, the peak oven temperatures of the first heating stage, the third heating stage or both the first and third heating stages, is at least 75° C. higher than the peak oven temperature of the second stage. Alternatively, peak oven temperatures of both the first and third heating stages are at least 100° C., or at least 150° C., or at least 200° C., or at least 300° C., or at least 400° C., or at least 500° C., or at least 600° C., or at least 700° C. higher, than the peak oven temperature of a second heating stage.

In an alternative embodiment, a multistage sintering process comprises, a first heating the stage for heating an oven to a first oven temperature in the range of 1000° C. to 1600° C., and lowering the oven temperature at least 50° C., or at least 100° C., until a second stage oven temperature is reached that is in the range of 800° C. to 1500° C. In a third heating stage, the oven is then heated to a third temperature that is between 1300° C. to 1700° C., and at least 50° C. higher than the second oven temperature.

In other embodiments, a multistage sintering process comprises, in a first heating stage, heating to a first oven temperature in the range of 1300° C. to 1700° C., and then lowering the oven temperature at least 25° C., or at least 100° C., to a second stage oven temperature. The second oven temperature may be in the range of 1000° C. to 1500° C., or 1000° C. to 1400° C. In a third heating stage, the oven is heated to a third temperature between 1350° C. to 1700° C., or between 1400° C. to 1700° C., and the third temperature is at least 25° C., or at least 100° C., or at least 150° C., higher than the second oven temperature.

In other embodiments, a multistage sintering comprises a first oven temperature in the range of 1350° C. to 1650° C., and lowering the oven temperature at least 200° C. to a second stage oven temperature that is in the range of 1000° C. to 1450° C. The oven is then heated to a third temperature between 1450° C. and 1650° C. that is at least 200° C. higher than the second oven temperature.

In other embodiments, a multistage sintering process comprises, in a first heating stage, heating to a first oven temperature in the range of 1350° C. to 1600° C., or 1350° C. to 1550° C., and lowering the oven temperature until a second stage oven temperature is reached that is in the range of 1000° C. to 1400° C., such as 1150° C. to 1250° C., or in the range of 1350° C. to 1450° C. The oven is heated to a third temperature in the range of 1350° C. to 1650° C., or 1450° C. to 1650° C., or 1530° C. to 1650° C., or 1550° C. to 1650° C. The second temperature may be at least 100° C., or 200° C., higher than the first oven temperature. The third temperature may be at least 100° C., or 200° C., higher than the second oven temperature.

In other embodiments, a multistage sintering process comprises, in a first heating stage, heating to a first oven temperature in the range of 1400° C. to 1600° C., and then lowering the oven temperature at least 100° C. to 500° C. to a second stage oven temperature in the range of 950° C. to 1400° C. In a third heating stage, the oven is heated to a third temperature between 1500° C. to 1700° C. that is at least 200° C. higher than the second oven temperature.

In a further embodiment, in a first heating stage, where the first oven temperature is in the range of 1400° C. to 1500° C., the oven temperature is lowered 200° C. to 400° C. to a second oven temperature in a second stage in the range of 1000° C. to 1300° C., and then, in a third heating stage, the second oven temperature is increased 400° C. to 700° C. to a third temperature in the range of 1500° C. to 1700° C.

In another embodiment, in a first heating stage the oven is heated to a first oven temperature in the range of 1500° C. to 1600° C., and then the oven temperature is lowered 150° C. to 400° C. to a second oven temperature in a second stage in the range of 1100° C. to 1400° C., and subsequently, in a third heating stage the second oven temperature is increased 200° C. to 350° C. to a third temperature in the range of 1500° C. to 1700° C.

The maximum (peak) oven temperature of the third stage may be higher or lower than, or the same as, the maximum oven temperature setting of the first stage, where the sintering profile has a second heating stage temperature between the first and third stages that is lower than the maximum oven temperature of the first or third heating stages. In one embodiment, the difference between the peak oven temperatures of the first and third heating stages is less than or equal to ±400° C., or the difference is less than or equal to ±300° C., or less than or equal to ±200° C., or less than or equal to ±100° C., or less than or equal to ±50° C.

In one embodiment, the first oven temperature of the first stage is less than or equal to 1460° C. or less than or equal to 1450° C., and the third oven temperature of the third heating stage is at least 125° C. higher than the oven temperature of the first heating stage, or at least 150° C. higher than the oven temperature of the first heating stage. In another embodiment, the first oven temperature of the first heating stage is less than or equal to 1360° C., or less than or equal to 1350° C., and the third oven temperature of the third heating stage is at least 200° C. higher than the first heating stage oven temperature, or at least 250° C. higher, or at least 300° C. higher than the first oven temperature, or at least 350° C. higher or at least 400° C. higher than the first oven temperature. In a further embodiment, the first oven temperature of the first heating stage is less than or equal to 1300° C., and the third oven temperature of the third heating stage is at least 300° C. higher, or at least 350° C. higher, than the first oven temperature.

Figure 7:
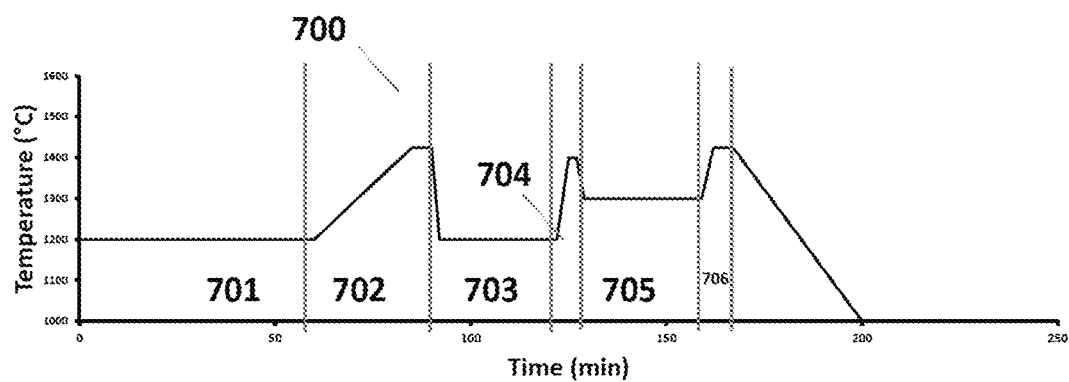
FIG. 7. Graphical representation of a sintering profile according to one embodiment.

Multistage sintering processes may have more than three heating stages. For example, in some embodiments, processes may have three or more heating stages each having a peak temperature that is at least 100° C., or at least 200° C., higher than a preceding or subsequent lower temperature stage. Optionally, lower temperature stages before and/or after a temperature spike may each have a dwell time of 1 minute to 60 minutes. FIG. 7 exemplifies a sintering process (700) having five heating stages following a preliminary heating stage (701). In three heating stages that each have a temperature peak (702, 704, and 706), the oven temperature is rapidly increased to the peak temperature for each stage, and held at an optional dwell time of from 1 minute to 10 minutes before rapidly decreasing. Intervening lower temperature stages (e.g., 703, 705) between temperature peaks (e.g., 702, 704, and 706) may each having dwell times greater than 10 minutes.

Figure 5:
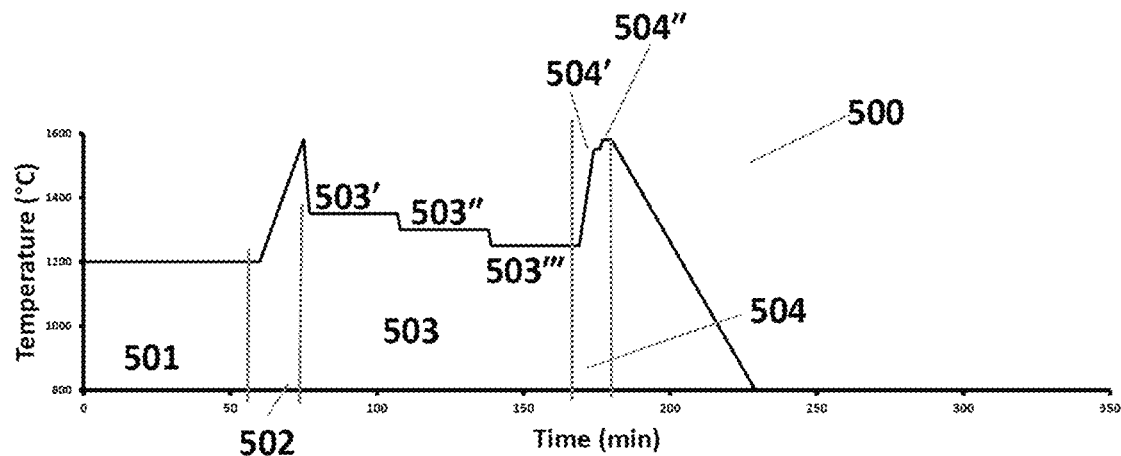
FIG. 5. Graphical representation of a sintering profile according to one embodiment.

In FIG. 5, a sintering profile (500) comprises a preliminary heating stage (501), a first heating stage (502), a second heating stage (503) and a third heating stage (504). The second heating stage that has 3 separate temperature steps (503', 503", 503''') that may not be considered separate heating stages where, for example, the temperature difference between two adjacent steps having dwell times of at least one minute is less than a threshold amount, such as less than 25° C., or less than 50° C., or less than 100° C., or where a temperature change in one direction (e.g., a temperature increase between 503' and 503") comprising a dwell time of at least one minute, is followed by a temperature change in the same direction (e.g., a further temperature decrease from 503" to 503''') with a dwell time of at least one minute. In FIG. 5 the third heating stage (504) shows two temperature steps (504' and 504"), each having a dwell time of between 1 and 2 minutes and a temperature difference between the two steps that is less than, for example, less than 25° C. In another embodiment, a sintering profile comprises a first heating stage with a first temperature in the range of 1350° C. to 1550° C. that is lowered to a second temperature in the range of 1150° C. to 1250° C. after an optional dwell time of 0 min. to 5 min. In a second heating stage, the second temperature is held for an optional dwell time of 60 min. to 120 min. A third heating stage comprises at least two temperature steps, wherein the first temperature step is from 1400° C. to 1500° C., and the first temperature step has a dwell time of 0 min. to 15 min., and a second temperature step that is greater than 1500° C. and less than 1600° C., having a dwell time of 0 min. to 20 min.

Figure 6:
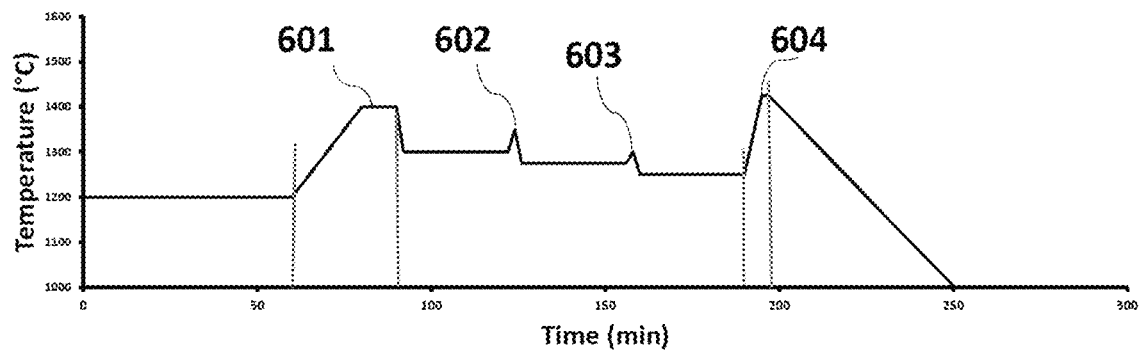
FIG. 6. Graphical representation of a sintering profile according to one embodiment.

In another embodiment as illustrated in FIG. 6, a sintering profile comprises a first temperature peak (601) in a first heating stage, a final temperature peak (604) in a final heating stage, and at least one intervening heating stage. Multiple temperature peaks (602, 603) are illustrated between temperature steps (605, 606, and 607) which may be considered separate heating stages. For example, a temperature peak (e.g. 602) between two temperature steps (e.g., 605 and 606) is greater than a threshold value, such as, at least 25° C. greater, or at least 50° C. greater. In one embodiment the peak temperature of the intervening heating stage is greater than a preceding temperature step having a dwell time of at least one minute (e.g., 605) and is also greater than the temperature of a subsequent temperature step having a dwell time of at least one minute (e.g. 606).

Figure 4:
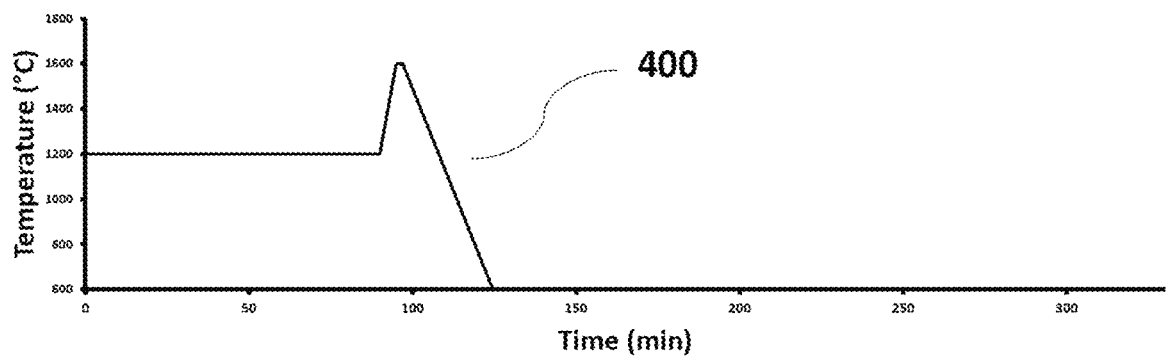
FIG. 4. Graphical representation of a sintering profile according to one embodiment.

In an alternative embodiment, exemplified in FIG. 4, a multistage sintering process 400 is provided that comprises a first heating stage having an oven temperature that is less than the second heating stage oven temperature. A first oven temperature may be less than or equal to 1530° C., or between 1000° C. and 1530° C., or between 1050° C. and 1450° C., or between 1000° C. and 1350° C., for a minimum dwell time greater than or equal to 10 minutes, or between about 10 minutes and 5 hours, or between 10 minutes and 2 hours. The first oven temperature is rapidly increased to a second oven temperature that is at least 25° C., or at least 50° C., higher than the first oven temperature. The second oven temperature is greater than 1555° C., for example, between 1555° C. and 1700° C. The second heating stage comprises an optional dwell time prior to cooling the oven to ambient temperature (e.g., 20° C. to 25° C.), for example, a dwell time of between 1 minutes and 30 minutes. In one embodiment the first heating stage comprises a first oven temperature that is between 1000° C. and 1350° C., having a minimum dwell time between 10 minutes and 5 hours, or between 10 minutes and 2 hours, and the final, second heating stage has a peak oven temperature between 1500° C. and 1650° C. with a dwell time between 0 minutes and 10 minutes.

Figure 8:
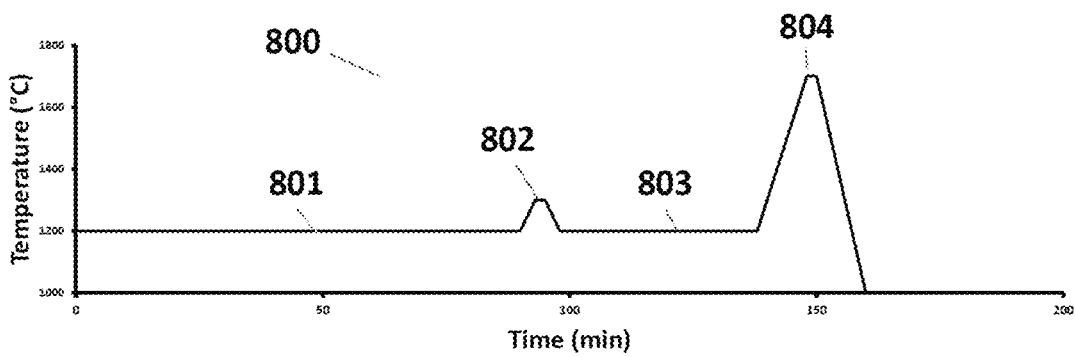
FIG. 8. Graphical representation of a sintering profile according to one embodiment.

In another embodiment, exemplified in FIG. 8, a multistage sintering process 800 is provided and comprises a first oven temperature 801 that may be the same as the preliminary heating temperature, and less than the second heating stage temperature 802. In a first heating stage, the preliminary heating temperature 801 (for example, from 1200° C. to 1500° C., or from 1350° C. to 1500° C., or from 1000° C. to 1350° C., such as, 1200° C.) is held for a dwell time of about 0 min. to 180 min., or 90 minutes. In a second heating stage the oven temperature is increased from 50° C. to 500°, or between 50° C. and 200° to a second heating temperature 802 in the range of 1200° C. to 1700° C., or 1400° C. to 1700° C., or 1530° C. to 1600° C. (e.g. 100° C., to a temperature of about 1300° C.) for a dwell time of about 0 minutes to 20 minutes, or 0 minutes to 10 minutes. In some embodiment, the sintering process comprises a third heating stage, wherein the oven temperature is decreased between 50° C. and 200° (e.g. to 1200° C.) to a third heating temperature 803 for a dwell time of about 0 min. to 120 min., or 40 minutes. The oven temperature is increased between 100° C. and 800° to a final oven temperature 804 that is between 1600° C. and 1800° C. for a dwell time of about 0 minutes to about 5 minutes.

The dwell time at one or more oven temperature settings may be from 0 minute (for no dwell time) up to 10 hours, such as 1 minute to 5 hours, 10 minutes to 5 hours, 1 minute to 2.5 hours, 10 minutes to 2.5 hours, 1 minute to 2 hours, 10 minutes to 2 hours, 1 minute to 1.5 hours, 1 minute to 1 hour, 1 minute to 30 minutes, 1 minute to 10 minutes, 1 minute to 5 minutes, or a dwell time of 1 minute to 2 minutes.

Multistage sintering processes may have a total run time of less than 12 hours, or less than 8, or less than 5 hours, or less than 3 hours, or less than 200 minutes, or less than 150 minutes or less than 130 minutes when calculated from the end of a preliminary heating stage, and until a cooling stage where the oven begins cooling to remove ceramic bodies.

Ceramic bodies may be partially sintered, or fully sintered to densities closely approaching the theoretical value for a given material (for example, 98.5% to 99.5% relative to the theoretical density). In some embodiments, after the first or the second heating stage, ceramic bodies may have a relative density greater than 85%, or greater than 90%, or greater than 95%, or greater than 97%, or greater than 98%, or greater than 98.5%, or greater than 99%, or greater than 99.2%, or greater than 99.5%, of full theoretical density.

Ceramic sintered bodies sintered according to the methods described herein, may have a smaller median grain size than compositionally similar ceramic bodies fully sintered by conventional processes. In one embodiment, an unshaded ceramic body of 5.3 mol % yttria-stabilized zirconia, sintered according to the methods described herein, has a median grain size in the range of 0.1 µm to 8 µm, or from 0.5 µm to 5 µm, or from 1 µm to 5 µm, or from 1 µm to 3 µm. In one embodiment, an unshaded ceramic body comprising approximately 4.7 mol % yttria-stabilized zirconia, sintered according to the methods described herein, has a median grain size in the range of from 0.1 µm to 3 µm, from 0.3 µm to 2 µm, or from 0.6 µm to 1.1 µm.

The fully sintered zirconia ceramic bodies may have substantially the same percent transmittance, or an increase in percent transmittance, compared to ceramic bodies sintered by longer, conventional processes, while maintaining a smaller grain size. In some embodiments, the percent transmittance (1 mm sample thickness, corrected transmittance, at 700 nm) of fully sintered zirconia ceramic bodies is at least 2% to 6% higher than zirconia ceramic bodies sintered by known methods.

In one embodiment, an unshaded (white) ceramic material comprising 4.5 mol % to 6 mol % yttria in an yttria-stabilized sintered zirconia body has a percent transmittance (1 mm sample thickness, corrected transmittance, at 700 nm) that is between 52% and 57%, and a median grain size that is between 0.1 µm and 2 µm. Unshaded (white) yttria-stabilized sintered zirconia bodies, as described herein, may have a percent transmittance that is greater than 56%, or greater than 57%, or greater than 58%, or greater than 59%, or greater than 60% (1 mm thick sample, corrected, measured at 700 nm), and a median grain size less than 1.9 µm. or less than 16 µm, or less than about 1.3 µm, or less than about 1.2 µm, or less than about 0.5 µm, or less than about 0.3 µm.

In some embodiments, ceramic bodies sintered by a multistage sintering process having a final heating peak temperature at least 50° C. higher than the temperature of the previous (or longest) heating stage, measure at least 2% higher in transmittance (the measured transmittance at 700 nm for a 1 mm thick sample), than material bodies sintered by a process without a final peak temperature. The translucency of the sintered ceramic bodies made according to the methods described herein may be 1% to 10% higher (measured as percent transmittance of a 1 mm thick sample at 700 nm) than equivalent ceramic bodies sintered by methods without a final peak temperature.

Sintered ceramic bodies are provided that have gloss measurements greater than 6 (in reflectance mode at 60° angle when measured according to the method described herein for the Novo-Curve gloss meter). Sintered bodies may also have gloss measurements at 60° angle in reflectance mode may be a value from 8 to 16, or the gloss measurement is greater than 8, 10, 12, or 14. In some embodiments, zirconia bodies sintered by a multistage sintering process, comprised of approximately 4.7 mol % yttria-stabilized zirconia, have flexural strength values in the range of 800 MPa to 1000 MPa, or in the range of 850 MPa to 980 MPa, or in the range of 860 MPa to 980 MPa, or in the range of 870 MPa to 920 MPa, or in the range of 880 MPa to 960 MPa, or in the range of 880 MPa to 1000 MPa.

Test Methods

Density

For the examples described herein, density calculations of ceramic bodies were determined as follows. The density of green body blocks were calculated by measuring the weight and dividing the weight by the volume calculated from the dimensions of the green block. The density of bisqued body blocks were determined by liquid displacement methods of Archimedes principle. Flat wafers were sectioned from a bisqued block and dried prior to measuring the dry mass. Samples were then saturated with deionized water under vacuum (29-30 in Hg vacuum pressure) for one hour prior to measuring the suspended and saturated masses. All masses were measured to four decimal points precision. A theoretical density of 6.056 g/mL was assumed for purposes of calculating relative density of samples comprising approximately 5.3 mol % yttria in yttria-stabilized zirconia; and 6.067 g/mL was assumed for purposes of calculating relative density of samples comprising approximately 4.7 mol % yttria in yttria-stabilized zirconia.

Translucency

Sintered body translucency was determined by measuring the percent transmittance of D65 light at a wavelength of 700 nm from a 1 mm thick sintered sample. Translucency wafers were sectioned from a bisqued block and machined to a diameter corresponding to a final diameter of 30 mm after sinter. The wafers were then ground flat until visually free of defects with 1200 and 2000 grit SiC polishing paper. The final bisqued thickness corresponded to 1.0 mm after sintering. Samples ground to the desired shape were removed of surface dust and then sintered according to the sintering profile(s) described.

After sintering, samples were briefly washed with isopropanol to remove errant surface material; however, no further surface preparation techniques were applied to the samples prior to testing. Total transmittance spectra were measured between the wavelengths of 360 nm to 740 nm with a Konica-Minolta CM5 spectrophotometer illuminated by a D65 light source. Information contained in the data tables herein refer to measurements at 700 nm wavelength (unless indicated otherwise), which are extracted from these measurements. The spectrophotometer was calibrated to white and black prior to measurement. Translucency samples were placed flush against the (approximately) 25 mm integrating sphere aperture. A minimum of two spectra were collected per sample and averaged to yield a final measured transmission spectra S-TM.

Gloss Measurement

Samples were prepared as 10 mm diameter tabs according to the method for Translucency (above), and measured for gloss using a Novo-Curve gloss meter.

The Novo-Curve gloss meter was calibrated by obtaining a gloss value of 93.1 with calibration bar. Samples having a diameter of 10 mm were measured with a Novo-Curve gloss meter in reflectance mode having a testing aperture diameter of 4.4 mm and a 60° angle according to the machine's procedure. Two measurements for each sample side were obtained.

Grain Size Measurement

Grain size measurements were performed on sintered materials as outlined in ASTM E112-10, Standard Test Method for Determining Average Grain Size. Sintered samples were polished to remove surface roughness, and thermally etched for 10 minutes in an oven heated to 1100° C., and a gold coating was applied to the etched samples. The samples were analyzed by FEI Magellan™ 400 Scanning Electron Microscope. The average grain size was estimated according to the Heyn (4) Lineal Intercept Procedure by counting the number of grains intercepted by one or more straight lines sufficiently long to yield at least 50 intercepts. The magnification of the samples were as follows: for average grain size less than 0.5 um, ×25000 magnification; grain size between 0.5 um and 1.5 um, ×12000 magnification; and, for grain size of greater than 1.5 um, ×5000 or ×12000, magnification.

Flexural Strength

Samples for three-point bend strength (flexural strength) testing were milled and prepared according to ISO 6872 for the preparation of strength testing for dental ceramic materials. Results are provided in MPa. Flexural strength bars of ceramic materials were milled out of a bisqued block then ground flat with 1200 grit SiC polishing paper until visually free of defects. The bisqued bars were ground to a thickness corresponding to approximately 1.68×25×4 mm3 after sintering. After sintering, the central region of both the tensile and compressive surfaces were visually inspected for defects by optical microscope. The side with the fewest observed defects was chosen as the side broken in tension (face-down in the test fixture). Flexural testing was performed on a Shimadzu EZ-Test universal testing machine with a custom built three-point bend fixture according to ISO 6872. The bars were aligned on the two rollers using a metal guide. Sample sets contained at least 10 bars. Flexural strengths were calculated via the measured breaking load and measured dimensions.

EXAMPLES

Examples 1-13

Zirconia ceramic bodies prepared by the multistage sintering profiles of Tables 1-4 were measured for optical properties and/or grain size.

Zirconia ceramic bodies were prepared from unshaded 5.3 mol % yttri a-stabilized zirconia ceramic powder (Zpex® Smile) obtained from Tosoh USA, Inc., and pressed by uniaxial pressing, to form a disk-shaped green body (98 mm diameter, thickness of 12 mm), having densities in the range of about 3.19 $g/cm^3$ to 3.23 $g/cm^3$.

The green stage ceramic bodies were pre-sintered in an oven gradually heated to 1020° C. and held at that temperature until porous bisque stage bodies were formed having densities of about 3.28 g/cm3.

The bisque stage ceramic bodies were shaped and sized according to the test procedures provided herein, and subjected to a preliminary heating stage prior to the multistage sintering process, as follows. In a preliminary heating stage, a sintering oven containing the bisque stage ceramic bodies was heated from ambient temperature to 1200° C. in 78 minutes, for a hold time of 1 hour.

After the preliminary heating step, the ceramic bodies were sintered according to the sintering profiles detailed in Tables 1-4. With reference to Example 1 (Ex. 1), the ceramic body was heated from 1200° C. after the preliminary heating step, as follows: in a first heating stage, the oven temperature was raised from the preliminary heating temperature (T0) of 1200° C. to 1300° C. at 2° C./min. and from 1300° C. to a first temperature (Peak T1) of 1530° C., at a rate of 10° C./min., with no dwell time at T1 (e.g., Hold t1 is 0); the sintering oven temperature was then lowered to a second temperature, (Peak T2) of 1300° C., in about 10 minutes. In this example, in a second heating stage, the samples were held at the second heating temperature (Peak T2) of 1300° C., for a dwell time (Hold t2) of 90 minutes. In a third heating stage, the oven temperature was increased from the second temperature (T2) to a third oven temperature (PeakT3) of 1580° C. at a rate in the range of 10° C./min. to 30° C./min., with a dwell time (Hold t3) of 2 minutes at T3, and in a cooling stage the oven was rapidly cooled to ambient temperature in about 30 minutes to 60 minutes. The rate of change (e.g., ramp rates) between heating stages for all examples were within the rates indicated above for Example 1.

Figure 2:
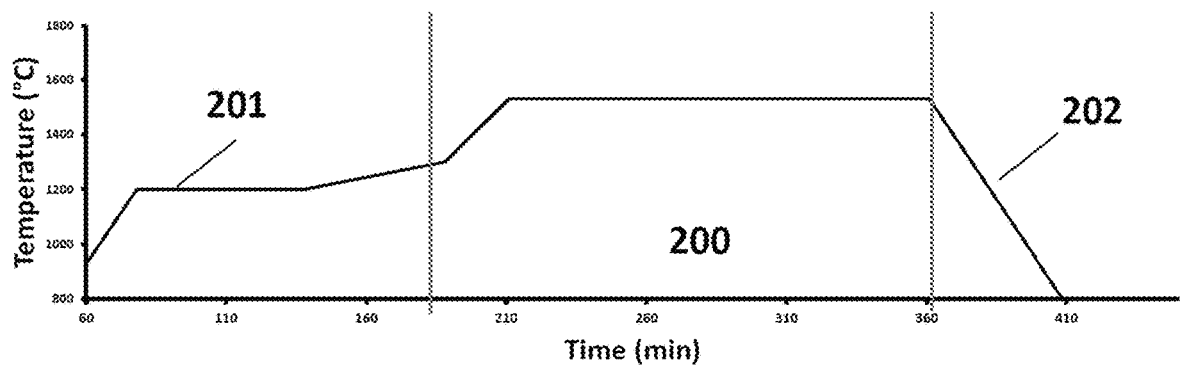
FIG. 2. Graphical representation of a conventional sintering profile.

Comparative Example 1 was sintered by a conventional sintering process, such as one exemplified in FIG. 2. In a preliminary heating stage (201), the oven temperature is raised from ambient temperature to 1200° C. in 78 minutes, for a hold time of 1 hour. The oven temperature is then raised in a first heating stage (200) to a sintering temperature of 1450° C., and held for 150 minutes before decreasing the temperature to ambient temperature in a cool-down stage (202).

In Comparative Examples 2-5 (Comp. 2-Comp. 5), after a preliminary heating step (i.e., the oven is heated from ambient temperature to 1200° C. in 78 minutes, for a hold time of 1 hour), sintering methods comprised a first heating stage which included a first heating temperature (i.e., Peak T1 at 1530° C.) with a hold time between 30 and 150 minutes (Hold t1 in min) as indicated in the tables. In Comp. 6, after heating to 1530° C., with no hold time the temperature was decreased to a second temperature, and in a second heating stage, the second temperature of 1300° C. (Peak T2) was held for 90 minutes (Hold t2) prior to a cool-down stage to remove the samples from the oven. Comp. 2-Comp. 6, had no final temperature peak greater than the immediately preceding heating stage (e.g., no Peak T3 or Hold t3).

Translucency values for the sintered bodies were measured according to the method provided herein, and calculated as percent transmittance (T %) for a 1 mm sample, at 700 nm, and reported in Tables 1-4. The change in translucency or percent transmittance (ΔT) was calculated as ΔT=55.0%−% transmittance of sample, where 55.0% is the percent transmittance of a 5.3 mol % yttria stabilized zirconia bisque body preliminarily heated and then sintered at 1450° C. for 150 minutes (substantially according to comparative example 1, 'Comp. 1'). Density (reported as $g/cm^3$) after final sintering, grain size, gloss, and/or strength values are reported in Tables 1-4. The data indicate enhanced translucency, gloss and/or decreased run time is achieved in examples when compared to comparative examples.

TABLE 1

Sintering Profiles, Translucency, Grain Size and Gloss for 5.3 YSZ Zirconia Sintered Ceramic Bodies.

| Comp./Ex.# | Peak T1 (° C.) | Hold t1 (min.) | Peak T2 (° C.) | Hold t2 (min.) | Peak T3 (° C.) | Hold t3 (min.) | Sinter density ($g/cm^3$) | T % | ΔT % from 55.0% | Grain size (μm) | Gloss |
|---|---|---|---|---|---|---|---|---|---|---|---|
| Comp.1 (control) | 1450 | 150 | — | — | — | — | — | 55.0 | — | — | 11.9 ± 2.1 |
| Comp 2 | 1530 | 30 | — | — | — | — | — | 56.89 | 1.9 | 1.6 | |
| Comp. 3 | 1530 | 60 | — | — | — | — | — | 57.26 | 2.2 | — | |
| Comp. 4 | 1530 | 150 | — | — | — | — | — | 56.6 | 1.6 | — | |
| Comp. 5 | 1530 | 150 | — | — | — | — | 6.03 | 57.73 | 2.7 | 2.1 | 14.1 + 1.5* |
| Comp. 6 | 1530 | 0 | 1300 | 90 | — | — | 6.02 | 48.8 | −6.2 | 0.5 | 6 ± 0.6 |
| Ex. 1 | 1530 | 0 | 1300 | 90 | 1580 | 2 | — | 55.4 | 0.3 | 1.0 | 9 ± 1.7 |
| Ex. 2 | 1530 | 0 | 1300 | 90 | 1580 | 5 | — | 54.0 | −1.1 | — | — |
| Ex. 3 | 1530 | 0 | 1300 | 90 | 1580 | 10 | 6.04 | 58.9 | 3.8 | 1.5 | 10 ± 1.3 |
| Ex. 4 | 1530 | 0 | 1300 | 90 | 1580 | 20 | — | 60.5 | 5.4 | — | — |
| Ex. 5 | 1450 | 0 | 1300 | 90 | 1580 | 10 | — | 54.0 | −1.0 | 1.7 | — |

TABLE 2.

Sintering Profiles, Translucency Measurements, and Grain Size Measurements for 5.3YSZ Zirconia Sintered Ceramic Bodies.

| Ex. No. | Peak T1 (° C.) | Hold t1 (min.) | Peak T2 (° C.) | Hold t2 (min.) | Peak T3 (° C.) | Hold t3 (min.) | T % | ΔT % (from 55.03%) | Grain size μm |
|---|---|---|---|---|---|---|---|---|---|
| Ex. 6 | 1530 | 0 | 1200 | 90 | 1580 | 2 | 53.5 | −1.5 | 1.00 |
| Ex. 7 | 1530 | 0 | 1200 | 90 | 1580 | 5 | 55.9 | 0.9 | — |
| Ex. 8 | 1530 | 0 | 1200 | 90 | 1580 | 10 | 57.1 | 2.1 | — |

TABLE 3

Sintering Profiles And Translucency Measurements for 5.3YSZ Zirconia Sintered Ceramic Bodies.

| Ex. No. | Peak T1 (° C.) | Hold t1 (min.) | Peak T2 (° C.) | Hold t2 (min.) | Peak T3 (° C.) | Hold t3 (min.) | Sinter Density ($g/cm^3$) | T % | ΔT % |
|---|---|---|---|---|---|---|---|---|---|
| Comp. 7 | 1350 | 0 | 1000 | 90 | — | — | 5.12 | 6.8 | −48.2 |
| Ex. 9 | 1300 | 0 | 1000 | 90 | 1595 | 10 | — | 42.1 | −12.9 |
| Ex. 10 | 1530 | 0 | 1300 | 30 | 1595 | 10 | — | 56.7 | 1.6 |

TABLE 4

Sintering Profiles, Translucency Measurements, Grain Size And Gloss Measurements for 5.3YSZ Zirconia Sintered Ceramic Bodies.

| Ex. # | Peak T1 (° C.) | Hold t1 (min.) | Peak T2 (° C.) | Hold t2 (min.) | Peak T3 (° C.) | Hold t3 (min.) | T % | ΔT % | Grain size (μm) | Gloss *,^ |
|---|---|---|---|---|---|---|---|---|---|---|
| Comp. 8 | 1580 | 20 | — | — | — | — | 56.46 | 1.4 | 1.9 | 11.9 ± 2.1* |
| Comp. 9 | 1580 | 0 | 1450 | 150 | — | — | 55 | 0.0 | 1.2 | — |
| Ex. 11 | 1580 | 0 | 1450 | 150 | 1580 | 10 | 56.95 | 1.9 | — | — |
| Ex. 12 | 1300 | 90 | 1580 | 10 | — | — | 51.3 | −3.7 | — | — |
| Ex. 13 | 1450 | 0 | 1300 | 90 | 1580 | 10 | 54.0 | −1.0 | 1.7 | — |

Examples 14-34

Zirconia ceramic bodies prepared by the multistage sintering profiles of Tables 5-9, were measured for optical properties and/or grain size.

Bisque stage zirconia ceramic bodies were prepared substantially according to Examples 1-13, from unshaded 5.3 mol % yttria-stabilized zirconia ceramic powder (ZPex® Smile) obtained from Tosoh USA, Inc., and pressed by uniaxial pressing, to form a disk-shaped green body 98 mm diameter, thickness of 12 mm), having densities in the range of about 3.19 g/cm$^3$ to 3.23 g/cm$^3$.

The green stage ceramic bodies were pre-sintered in an oven gradually heated to 1020° C. and held at that temperature until porous bisque stage bodies were formed having densities of about 3.28 g/cm$^3$. The sintering profiles for bisque stage zirconia ceramic bodies, percent translucencies measured according to the method provided herein, and grain sizes are provided in Tables 5-9. The bisque stage bodies of comparative examples (Comp. 10-16), were prepared substantially according to the bisque stage bodies of Examples 14-34, and then sintered according to the sintering profiles provided in Tables 5-9.

Figures 12, 13:
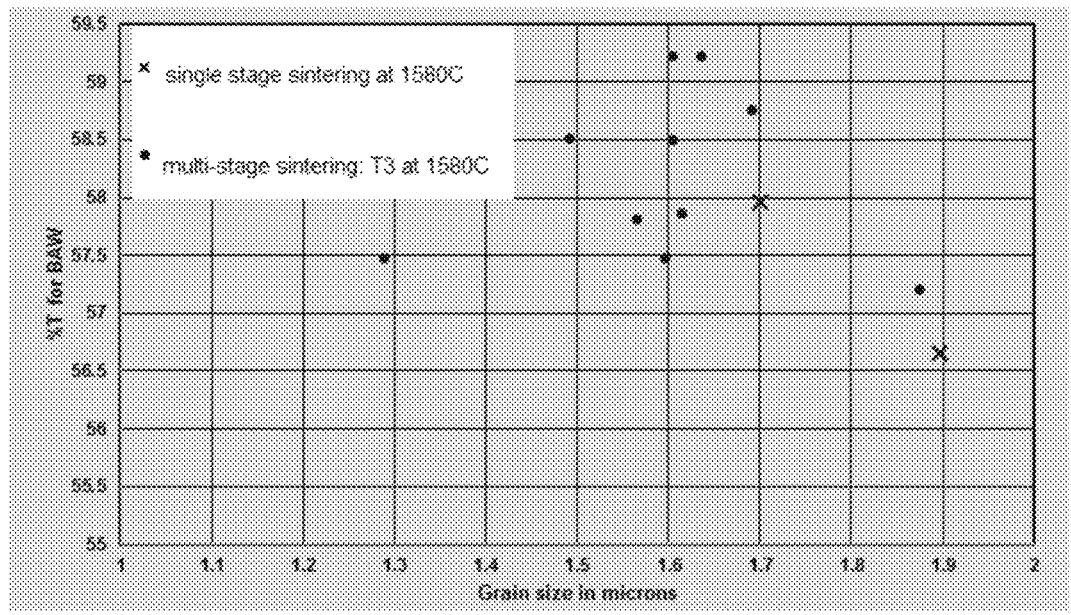
FIG. 12. Graphical representation plotting grain size (µm) and translucency. measured as percent transmittance (% T) at 700 nm.
FIG. 13. Graphical representation plotting grain size (µm) and translucency measured as percent transmittance (% T) at 700 nm.

Examples prepared by multi-stage sintering processes obtained high translucency values and low grain sizes. Translucency measured according to the methods provided herein, as percent transmittance of a 1 mm thick sintered body at 700 nm, was plotted against grain size, to illustrate higher translucency is achieved for a given grain size, for ceramic bodies sintered by the multi-stage sintering processes. Results for zirconia ceramic bodies sintered by multi-stage sintering methods having a final peak temperature at 1580° C. (i.e., bodies made according to Examples 14, 19, 21-25, and 32-34) versus samples sintered at only 1580° C. (i.e., bodies may according to Comp. Examples 15 and 16) are plotted in FIG. 12. Results for zirconia ceramic bodies sintered by multi-stage sintering methods having a final peak temperature at 1650° C. (i.e., bodies made according to Examples 18, 29, 30 and 31) versus samples sintered at only 1650° C. (i.e., bodies may according to Examples 26-28) are plotted in FIG. 13.

TABLE 5

Sintering Profiles, Translucency Measurements, and Grain Size Measurements for 5.3YSZ Zirconia Sintered Ceramic Bodies.

| Example # | Peak T1 (° C.) | Hold t1 (min.) | Peak T2 (° C.) | Hold t2 (min.) | Peak T3 (° C.) | Hold t3 (min.) | T % | Grain size |
|---|---|---|---|---|---|---|---|---|
| Comp 10 | 1450 | 150 | — | — | — | — | 56.2 | 0.8 |
| Comp. 11 | 1530 | 150 | — | — | — | — | 57.0 | 1.7 |

TABLE 6

Sintering Profiles, Translucency Measurements, and Grain Size Measurements for 5.3YSZ Zirconia Sintered Ceramic Bodies.

| Example# | Peak T1 (° C.) | Hold t1 (min.) | Peak T2 (° C.) | Hold t2 (min.) | Peak T3 (° C.) | Hold t3 (min.) | T % | Grain Size |
|---|---|---|---|---|---|---|---|---|
| Comp 12 | 1530 | 0 | | | | | 43.5 | |
| Comp 13 | 1530 | 0 | 1300 | 90 | | | 46.4 | 0.7 |
| Comp 14 | 1530 | 0 | 1300 | 48 hrs | | | 55.0 | 0.8 |
| Ex. 14 | 1530 | 0 | 1300 | 90 | 1580 | 10 | 57.8 | 1.4 |
| Ex. 15 | 1530 | 0 | 1300 | 30 | 1595 | 10 | 58.4 | 1.7 |
| Ex. 16 | 1530 | 0 | 1300 | 90 | 1600 | 10 | 58.9 | 1.7 |
| Ex. 17 | 1530 | 0 | 1300 | 90 | 1625 | 10 | — | 2.8 |
| Ex. 18 | 1530 | 0 | 1300 | 90 | 1650 | 10 | 61.6 | 4.3 |

TABLE 7

Sintering Profiles, Translucency Measurements, and Grain Size Measurements for 5.3YSZ Zirconia Sintered Ceramic Bodies.

| Example# | Peak T1 (° C.) | Hold t1 (min.) | Peak T2 (° C.) | Hold t2 (min.) | Peak T3 (° C.) | Hold t3 (min.) | T % | Grain Size |
|---|---|---|---|---|---|---|---|---|
| Comp 13 | 1530 | 0 | 1300 | 90 | | | 46.4 | 0.7 |
| Ex. 19 | 1300 | 90 | 1580 | 10 | — | — | 57.2 | 1.7 |
| Ex. 14 | 1530 | 0 | 1300 | 90 | 1580 | 10 | 57.8 | 1.4 |
| Ex. 20 | 1530 | 0 | 1300 | 90 | 1580 | 10 | 58.5 | 1.5 |
| Ex. 21 | 1530 | 0 | 1300 | 90 | 1580 | 20 | 59.2 | 1.6 |
| Ex. 22 | 1530 | 0 | 1300 | 90 | 1580 | 20 | 58.5 | 1.6 |
| Ex. 23 | 1580 | 0 | 1450 | 150 | 1580 | 10 | 57.5 | 1.5 |
| Ex. 24 | 1530 | 0 | 1200 | 90 | 1580 | 5 | 57.5 | 1.3 |
| Ex. 25 | 1530 | 0 | 1200 | 90 | 1580 | 10 | 57.9 | 1.6 |

TABLE 8

Sintering Profiles, Translucency Measurements, and Grain Size Measurements for 5.3YSZ Zirconia Sintered Ceramic Bodies.

| Example# | Peak T1 (° C.) | Hold t1 (min.) | Peak T2 (° C.) | Hold t2 (min.) | Peak T3 (° C.) | Hold t3 (min.) | T % | Grain Size |
|---|---|---|---|---|---|---|---|---|
| Ex. 26 | 1650 | 10 | — | — | — | — | 60.7 | 4.0 |
| Ex. 27 | 1650 | 10 | — | — | — | — | 60.7 | 5.3 |
| Ex. 28 | 1650 | 20 | — | — | — | — | 61.8 | 7.2 |
| Ex. 29 | 1530 | 0 | 1300 | 90 | 1650 | 5 | 62.0 | 4.0 |
| Ex. 18 | 1530 | 0 | 1300 | 90 | 1650 | 10 | 61.6 | 4.3 |
| Ex. 30 | 1450 | 0 | 1000 | 90 | 1650 | 10 | 60.6 | 4.7 |
| Ex. 31 | 1450 | 0 | 1100 | 90 | 1650 | 10 | 61.9 | 4.6 |

TABLE 9

Sintering Profiles, Translucency Measurements, and Grain Size Measurements for 5.3YSZ Zirconia Sintered Ceramic Bodies.

| Example# | Peak T1 (° C.) | Hold t1 (min.) | Peak T2 (° C.) | Hold t2 (min.) | Peak T3 (° C.) | Hold t3 (min.) | T % | Grain Size |
|---|---|---|---|---|---|---|---|---|
| Comp. 15 | 1580 | 10 | | | | | 58.0 | 1.7 |
| Comp 16 | 1580 | 20 | — | — | — | — | 56.7 | 1.9 |
| Ex. 32 | 1450 | 0 | 1300 | 90 | 1580 | 10 | 59.2 | 1.6 |
| Ex. 33 | 1450 | 0 | 1300 | 90 | 1580 | 10 | 58.8 | 1.7 |
| Ex. 34 | 1530 | 0 | 1300 | 90 | 1580 | 10 | 58.5 | 1.5 |

Examples 35-73

Zirconia ceramic bodies were prepared by sintering according to the multistage sintering profiles of Tables 10-20. The ceramic bodies were measured for transmittance, grain size, strength and/or gloss.

Zirconia ceramic bodies were prepared by consolidating unshaded 4.7 mol % yttria-stabilized zirconia ceramic powder (Tosoh USA, Inc.), by a slip-casting process. An aqueous ceramic slurry comprising a mixture of ceramic powders having 4.7 mol % yttria-stabilized zirconia powder was slip-cast into a mold, and water was removed to consolidate the ceramic powder to form a green body 98 mm diameter, thickness of 1.2 mm.).

The green stage ceramic bodies were dried and pre-sintered in an oven that was gradually heated to 950° C. and held at that temperature until porous bisque stage bodies were formed having densities of approximately 3.6 g/cm$^3$ to 3.9 g/cm$^3$. Prior to sintering by the multistage sintering process, the porous, pre-sintered bodies were preliminarily heated at a temperature (T0), and for a time (H0), as indicated in the tables below. Without cooling, the ceramic bodies were sintered according to the multistage sintering process indicated in Tables 10-20. Where T1 was at least 1200° C., oven temperature was increased from a preliminary heating temperature to 1200° C. at a rate of 2° C./min. Where T1 was greater than 1200° C., the oven temperature was further increased from 1200° C. to T1 at a rate of 10° C./min. Where T1 was less than 1100° C., the oven temperature was increased from ambient temperature to T1 at 15° C./min.

Figure 9:
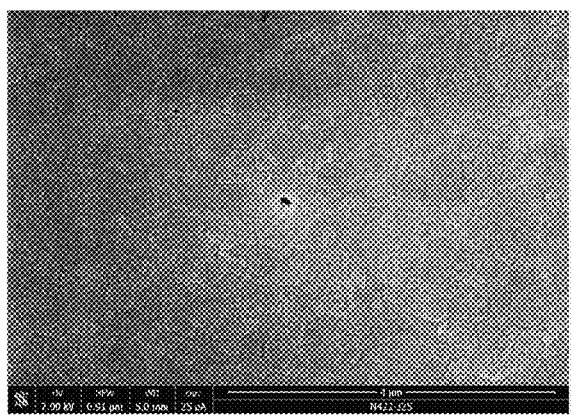
FIG. 9. SEM image of a zirconia ceramic body.
Figure 10:
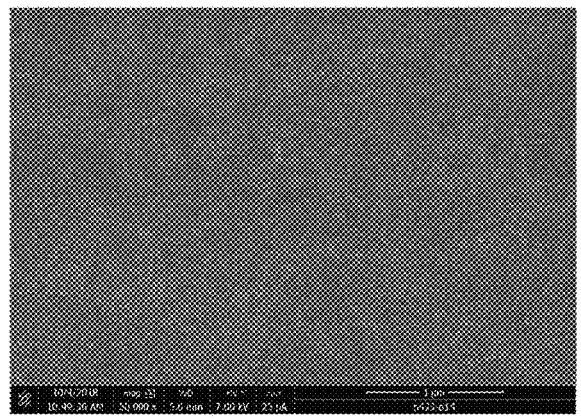
FIG. 10. SEM image of a zirconia ceramic body.
Figure 11:
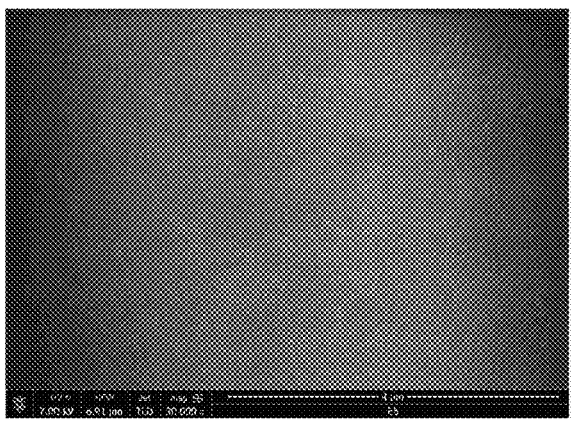
FIG. 11. SEM image of a zirconia ceramic body sintered by an exemplary multi-stage sintering process.

Percent transmittance values (% T at 700 nm, by the method provided herein) were reported in the tables, as well as the change in transmittance (Δ T). α T was determined by calculating the difference in percent transmittance between an example and a compositionally equivalent ceramic body of either Comp. 17 or Comp. 18* (samples with (Δ T) calculated from Comp. 18 are indicated by *). Comp. 17 and Comp. 18* were similarly prepared to the examples, but were sintered at 1450° C. for 150 minutes, rather than by a multistage heating process as indicated in the tables. Grain size, gloss values, and/or strength properties were tested according to the methods provided herein, and reported in the tables below. SEM images of Comp. 19 and Comp. 23, are seen in FIGS. 9 and 10, respectively. SEM image of Ex. 40, is seen in FIG. 11.

TABLE 10

Sintering Profiles for 4.7 mol % Yttria-Stabilized Zirconia Bodies and Properties Thereof.

| Ex. No. | Preliminary Heating Stage | | Peak T1 (° C.) | Hold t1 (min) | Peak T2 (° C.) | Hold t2 (min) | Peak T3 (° C.) | Hold t3 (min) | Peak T4 (° C.) | Hold t4 (min) | T % | ΔT | Grain Size | Gloss |
|---|---|---|---|---|---|---|---|---|---|---|---|---|---|---|
| | Peak T0 (° C.) | Hold t0 (min) | | | | | | | | | | | | |
| Comp. 17 | 1200 | 60 | 1450 | 150 | | | | | | | 56.2 | | | 11 ± 1.9 |
| Comp. 18 | 1100 | 60 | 1450 | 150 | | | | | | | 55.3 | n/a | 0.6 | |
| Comp. * 19 | 1100 | 60 | 1450 | 0 | — | — | — | — | — | — | 43.5 | −11.8 | 0.4 | |
| Comp. 20 | 1200 | 60 | 1530 | 150 | | | | | | | 56.1 | −0.1 | 1.0 | 18 ± 2.7 |

TABLE 11

Sintering Profiles for 4.7 mol % Yttria-Stabilized Zirconia Bodies and Properties Thereof.

| Ex. No. | Peak T0 (° C.) | Hold t0 (min) | Peak T1 (° C.) | Hold t1 (min) | Peak T2 (° C.) | Hold t2 (min) | Peak T3 (° C.) | Hold t3 (min) | Peak T4 (° C.) | Hold t4 (min.) | T % | ΔT | Grain Size |
|---|---|---|---|---|---|---|---|---|---|---|---|---|---|
| Comp. 21 | 1100 | 60 | 1450 | 0 | 1250 | 60 | | | | | 43.1 | −13.1 | — |
| Comp. 22 | 1100 | 60 | 1450 | 0 | 1300 | 60 | | | | | 49.1 | −7.0 | 0.3 |
| *Comp. 23 | 1100 | 60 | 1450 | 0 | 1300 | 90 | — | — | | | 47.7 | −7.6 | 0.4 |

TABLE 12

Sintering Profiles for 4.7 mol % Yttria-Stabilized Zirconia Bodies and Properties Thereof.

| Ex. No. | Peak T0 (° C.) | Hold t0 (min) | Peak T1 (° C.) | Hold t1 (min) | Peak T2 (° C.) | Hold t2 (min) | Peak T3 (° C.) | Hold t3 (min) | Peak T4 (° C.) | Hold t4 (min.) | T % | ΔT | Grain Size |
|---|---|---|---|---|---|---|---|---|---|---|---|---|---|
| *Ex. 35 | 1100 | 60 | 1450 | 0 | 1200 | 90 | 1530 | 10 | | | 56.7 | 1.4 | 0.6 |
| Ex. 36 | — | — | 1000 | 0 | 800 | 90 | 1530 | 2 | | | 53.2 | −3.0 | — |
| Ex. 37 | 1100 | 60 | 1200 | 0 | 1000 | 90 | 1530 | 2 | | | 56.9 | 0.7 | 0.4 |
| Ex. 38 | 1100 | 60 | 1300 | 0 | 1000 | 90 | 1530 | 2 | | | 55.9 | −0.3 | — |

TABLE 13

Sintering Profiles for 4.7 mol % Yttria-Stabilized Zirconia Bodies and Properties Thereof.

| Ex. No. | Peak T0 (° C.) | Hold t0 (min) | Peak T1 (° C.) | Hold t1 (min) | Peak T2 (° C.) | Hold t2 (min) | Peak T3 (° C.) | Hold t3 (min) | Peak T4 (° C.) | Hold t4 (min.) | T % | ΔT | Grain Size |
|---|---|---|---|---|---|---|---|---|---|---|---|---|---|
| * Ex. 39 | 1100 | 60 | 1450 | 0 | 1200 | 90 | 1550 | 5 | | | 57.0 | 1.7 | 0.7 |
| * Ex. 40 | 1100 | 60 | 1450 | 0 | 1400 | 45 | 1550 | 5 | | | 56.7 | 1.4 | 0.6 |
| * Ex. 41 | 1100 | 30 | 1550 | 5 | | | | | | | 56.7 | 1.4 | 0.8 |

TABLE 14

Sintering Profiles for 4.7 mol % Yttria-Stabilized Zirconia Bodies and Properties Thereof.

| Ex. No. | Peak T0 (° C.) | Hold t0 (min) | Peak T1 (° C.) | Hold t1 (min) | Peak T2 (° C.) | Hold t2 (min) | Peak T3 (° C.) | Hold t3 (min) | Peak T4 (° C.) | Hold t4 (min.) | T % | ΔT |
|---|---|---|---|---|---|---|---|---|---|---|---|---|
| *Ex. 42 | 1200 | 60 | 1580 | 0 | 1200 | 90 | 1550 | 0 | | | 57.2 | 1.0 |
| *Ex. 43 | 1200 | 60 | 1580 | 0 | 1350 | 90 | 1550 | 0 | | | 57.0 | 0.8 |

TABLE 15

Sintering Profiles for 4.7 mol % Yttria-Stabilized Zirconia Bodies and Properties Thereof.

| Ex. No. | Peak T0 (° C.) | Hold t0 (min) | Peak T1 (° C.) | Hold t1 (min) | Peak T2 (° C.) | Hold t2 (min) | Peak T3 (° C.) | Hold t3 (min) | Peak T4 (° C.) | Hold t4 (min.) | T % | ΔT |
|---|---|---|---|---|---|---|---|---|---|---|---|---|
| Ex. 44 | 1000 | 90 | 1580 | 2 | | | | | | | 57.0 | 0.8 |
| Ex. 45 | 1200 | 150 | 1580 | 0 | | | | | | | 55.9 | −0.3 |
| Ex. 46 | 1200 | 90 | 1580 | 0 | | | | | | | 57.4 | 1.2 |
| *Ex. 47 | 1200 | 60 | 1300 | 0 | 1200 | 90 | 1580 | 0 | | | 57.2 | 1.0 |
| Ex. 48 | 1200 | 60 | 1450 | 0 | 1100 | 90 | 1580 | 0 | | | 57.0 | 0.8 |
| Ex. 49 | 1200 | 60 | 1450 | 0 | 1200 | 90 | 1580 | 2 | | | 57.4 | 1.2 |
| Ex. 50 | 1100 | 60 | 1450 | 0 | 1200 | 90 | 1580 | 5 | | | 57.4 | 1.2 |
| Ex. 51 | 1200 | 60 | 1450 | 0 | 1200 | 90 | 1580 | 10 | | | 57.2 | 1.0 |

TABLE 16

Sintering Profiles for 4.7 mol % Yttria-Stabilized Zirconia Bodies and Properties Thereof.

| Ex. No. | Peak T0 (° C.) | Hold t0 (min) | Peak T1 (° C.) | Hold t1 (min) | Peak T2 (° C.) | Hold t2 (min) | Peak T3 (° C.) | Hold t3 (min) | Peak T4 (° C.) | Hold t4 (min.) | T % | ΔT | Grain Size |
|---|---|---|---|---|---|---|---|---|---|---|---|---|---|
| Ex. 52 | — | — | 1000 | 0 | 800 | 90 | 1550 | 2 | 1580 | 2 | 57.4 | 1.2 | — |
| Ex. 53 | — | — | 1000 | 0 | 800 | 90 | 1580 | 2 | | | 57.7 | 1.5 | 0.6 |
| Ex. 54 | — | — | 1000 | 0 | 900 | 90 | 1580 | 2 | | | 57.3 | 1.2 | 0.6 |
| Ex. 55 | — | — | 1100 | 0 | 1000 | 90 | 1580 | 2 | | | 57.4 | 1.2 | 0.6 |
| Ex. 56 | — | — | 1100 | 60 | 1000 | 90 | 1580 | 2 | | | 57.1 | 0.9 | 0.6 |
| Ex. 57 | — | — | 1450 | 0 | 1200 | 90 | 1580 | 5 | | | 57.7 | 1.5 | — |

TABLE 17

Sintering Profiles for 4.7 mol % Yttria-Stabilized Zirconia Bodies and Properties Thereof.

| Ex. No. | Peak T0 (° C.) | Hold t0 (min) | Peak T1 (° C.) | Hold t1 (min) | Peak T2 (° C.) | Hold t2 (min) | Peak T3 (° C.) | Hold t3 (min) | Peak T4 (° C.) | Hold t4 (min.) | T % | ΔT | Grain Size | Gloss |
|---|---|---|---|---|---|---|---|---|---|---|---|---|---|---|
| Ex. 58 | 1100 | 60 | 1450 | 0 | 1200 | 90 | 1550 | 5 | 1580 | 2 | 57.8 | 1.6 | — | 9 ± 3.3 |
| Ex. 59 | 1100 | 60 | 1450 | 00 | 1200 | 90 | 1475 | 5 | 1550 | 10 | 56.6 | | — | 14 ± 4.2 |
| * Ex 60 | 1100 | 60 | 1450 | 0 | 1200 | 90 | 1475 | 5 | 1550 | 10 | 56.6 | 1.3 | — | |
| * Ex. 61 | 1100 | 60 | 1475 | 90 | 1550 | 10 | | | | | 55.5 | 0.2 | 0.8 | |

TABLE 18

Sintering Profiles for 4.7 mol % Yttria-Stabilized Zirconia Bodies and Properties Thereof.

| Ex. No. | Peak T0 (° C.) | Hold t0 (min) | Peak T1 (° C.) | Hold t1 (min) | Peak T2 (° C.) | Hold t2 (min) | Peak T3 (° C.) | Hold t3 (min) | T % | ΔT | Grain Size |
|---|---|---|---|---|---|---|---|---|---|---|---|
| *Ex. 62 | 1100 | 60 | 1450 | 0 | 1300 | 90 | 1650 | 10 | 57.0 | 1.7 | 1.4 |
| *Ex. 63 | 1100 | 60 | 1450 | 0 | 1300 | 90 | 1650 | 10 | 57.2 | 1.9 | — |
| *Ex. 64 | 1100 | 60 | 1530 | 0 | 1300 | 90 | 1650 | 10 | 56.8 | 1.5 | 1.3 |

TABLE 19

Sintering Profiles for 4.7 mol % Yttria-Stabilized Zirconia Bodies and Properties Thereof.

| Ex. No. | Peak T0 (° C.) | Hold t0 (min) | Peak T1 (° C.) | Hold t1 (min) | Peak T2 (° C.) | Hold t2 (min) | Peak T3 (° C.) | Hold t4 (min) | T % | ΔT |
|---|---|---|---|---|---|---|---|---|---|---|
| Ex. 65 | 1200 | 60 | 1450 | 0 | 1200; 1100; 1000; | 30 min at each ° C. | 1580 | | 56.6 | 0.4 |
| Ex. 66 | 1200 | 60 | 1450 | 0 | 1200; 1100; 1000; | 30 min at each ° C. | 1580 | | 57.0 | 0.8 |

TABLE 20

Flexural Strength Results for Sintered 4.7 mol % Yttria-Stabilized Zirconia Bodies.

| Ex. No. | Peak T1 (° C.) | Hold t1 (min) | Peak T2 (° C.) | Hold t2 (min) | Peak T3 (° C.) | Hold t3 (min) | Peak T4 (° C.) | Hold t4 (min) | Strength (MPa) |
|---|---|---|---|---|---|---|---|---|---|
| Ex. 67 | 1450 | 0 | 1200 | 90 | 1550 | 5 | 1580 | 2 | 898 |
| Comp. 17 | 1450 | 150 | — | — | — | — | — | — | 843 |
| Ex. 68 | 1450 | 0 | 1200 | 90 | 1580 | 2 | — | — | 898 |
| Comp. 24 | 1530 | 150 | — | — | — | — | — | — | 790 |
| Comp. 25 | 1450 | 150 | — | — | — | — | — | — | 843 |
| Ex. 69 | 1450 | 0 | 1200 | 90 | 1475 | 5 | 1550 | 10 | 887 |
| Comp. 26 | 1530 | 60 | — | — | — | — | — | — | 772 |

TABLE 20-continued

Flexural Strength Results for Sintered 4.7 mol % Yttria-Stabilized Zirconia Bodies.

| Ex. No. | Peak T1 (° C.) | Hold t1 (min) | Peak T2 (° C.) | Hold t2 (min) | Peak T3 (° C.) | Hold t3 (min) | Peak T4 (° C.) | Hold t4 (min) | Strength (MPa) |
|---|---|---|---|---|---|---|---|---|---|
| Ex. 70 | 1450 | 0 | 1200 | 90 | 1475 | 5 | 1550 | 10 | 874 |
| Comp. 27 | 1530 | 60 | — | — | — | — | — | — | 745 |
| Ex. 71 | 1450 | 0 | 1400 | 45 | 1475 | 5 | 1550 | 10 | 875 |
| Comp. 28 | 1475 | 15 | 1550 | 10 | — | — | — | — | 856 |
| Comp. 29 | 1500 | 10 | 1550 | 20 | — | — | — | — | 795 |
| Ex. 72 | 1450 | 0 | 1200 | 90 | 1475 | 5 | 1550 | 10 | 893 |
| Ex. 73^ | 1450 | 0 | 1400 | 45 | 1550 | 10 | — | — | 883 |

^preliminary heating stage was 1100 for 30 minutes.

To test flexural strength, zirconia bisque bodies comprised of 4.7 mol % yttria-stabilized zirconia ceramic were prepared and heated in a preliminary heating stage at 1100° C. for 60 minutes prior to sintering, except as indicated in Table 20. The zirconia ceramic bodies were sintered according to the sintering profiles in Table 20, and tested according to the three-point bend strength test provided herein, the results of which are provided in Table 20. Zirconia ceramic bodies prepared by the multistage sintering methods demonstrated higher flexural strength values than comparative examples.

We claim:

1. A method for forming a sintered ceramic body comprising
heating a bisque stage ceramic body in a heating chamber of a sintering oven, comprising
i. in a first heating stage, heating the sintering oven containing the bisque stage ceramic body to a first temperature that is from 1300° C. to 1700° C. for an optional first dwell time between 0 minutes and 10 minutes, and lowering the first temperature at least 25° C. to a second temperature;
ii. in a second heating stage wherein the second temperature is from 1000° C. to 1500° C., holding the second temperature for a second dwell time of at least 2 minutes; and
iii. in a third heating stage, increasing the second temperature at least 25° C. to a third temperature from 1400° C. to 1700° C. for an optional third dwell time between 0 minutes and 20 minutes before cooling in a cooling stage.

2. The method of claim 1, wherein heating to the first temperature comprises a ramp rate of 0.5° C./minute to 60° C./minutes.

3. The method of claim 1, comprising a preliminary heating stage that precedes the first heating stage, having a preliminary heating temperature that is from 1000° C. to 1350° C., and that is lower than the first temperature.

4. The method of claim 1, comprising a ramp rate of 1° C./minute and 60° C./minutes from the second temperature and the third temperature.

5. The method of claim 1, wherein the second dwell time is from 2 minutes to 120 minutes.

6. The method of claim 1, wherein the first and third temperatures are 50° C. to 450° C. higher than the second temperature.

7. The method of claim 1, wherein the first temperature is lower than the third temperature by 0° C. to 400° C.

8. The method of claim 1, wherein
i. the first temperature is from 1350° C. to 1550° C.,
ii. the second temperature is from 1000° C. to 1400° C., and
iii. the third temperature is from 1500° C. to 1650° C.

9. The method of claim 1, wherein
i. the first temperature is from 1350° C. to 1550° C. and the first dwell time is from 0 minutes to 5 minutes,
ii. the second temperature is from 1150° C. to 1250° C. and the second dwell time is from 60 minutes to 120 minutes, and
iii. the third temperature is from 1530° C. to 1650° C. and the third dwell time is from 0 minutes to 15 minutes.

10. The method of claim 1, wherein the heating program is less than 3 hours between starting the first heating stage and completing a final dwell time of a final heating stage.

11. The method of claim 1, wherein the ceramic body comprises yttria-stabilized zirconia stabilized comprising from 2 mol % to 8 mol % yttria.

* * * * *